United States Patent
Broz et al.

(10) Patent No.: US 10,505,869 B2
(45) Date of Patent: Dec. 10, 2019

(54) MIMICKING A PRESENCE NOTIFICATION FROM AN APPLICATION EXECUTING ON A VIRTUAL COMPONENT TO OPTIMIZE COMPUTING RESOURCE ALLOCATION/UTILIZATION

(71) Applicant: International Business Machines Corporation, Armonk, NY (US)

(72) Inventors: Michal Broz, Austin, TX (US); Steven D. Clay, Round Rock, TX (US); Richard S. Schwerdtfeger, Round Rock, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 14/817,646

(22) Filed: Aug. 4, 2015

(65) Prior Publication Data
US 2017/0041184 A1    Feb. 9, 2017

(51) Int. Cl.
*G06F 1/32* (2019.01)
*G06F 9/455* (2018.01)
(Continued)

(52) U.S. Cl.
CPC ............ *H04L 49/70* (2013.01); *G06F 1/3203* (2013.01); *G06F 9/00* (2013.01); *H04L 43/0817* (2013.01);
(Continued)

(58) Field of Classification Search
CPC .. G06F 9/45558–455595; G06F 9/4856–4875; G06F 1/3203–3296
See application file for complete search history.

(56) References Cited

U.S. PATENT DOCUMENTS 8,098,585 B2   1/2012  Jiang et al.
8,271,814 B2   9/2012  Padmanabhan et al.
(Continued)

OTHER PUBLICATIONS

Contractor et al., "Analyzing Trustworthiness of Virtual Machines in Data-Intensive Cloud Computing", 2014 IEEE Twelfth Annual International Conference on Privacy, Security and Trust (PST), Jul. 23-24, 2014, pp. 403-406.
(Continued)

*Primary Examiner* — Emmanuel L Moise
*Assistant Examiner* — Julian Chang
(74) *Attorney, Agent, or Firm* — Michael O'Keefe; Edell, Shapiro & Finnan, LLC

(57) ABSTRACT

According to embodiments of the present invention, machines, systems, computer-implemented methods and computer program products for mimicking a presence notification to optimize utilization of computing resources of a system comprising a plurality of virtual components and a virtual component manager are provided. Using the virtual component manager, one or more components that are each performing functions limited to providing a presence notification may be detected. The detected one or more components may be suspended, and the presence notifications for each suspended component may be generated and transmitted by the virtual component manager. Suspending a component that is solely providing a presence notification frees up resources that may be utilized for another component performing computational work.

27 Claims, 10 Drawing Sheets

(51) Int. Cl.
  *H04L 12/931*   (2013.01)
  *G06F 1/3203*   (2019.01)
  *H04L 12/26*    (2006.01)
  *G06F 9/00*     (2006.01)
  *G06F 9/48*     (2006.01)

(52) U.S. Cl.
  CPC .. *G06F 9/4856* (2013.01); *G06F 2009/45575* (2013.01)

(56) References Cited

U.S. PATENT DOCUMENTS

| | | | |
|---|---|---|---|
| 8,424,000 B2 | 4/2013 | Vijay et al. | |
| 8,880,687 B1 | 11/2014 | Chandrachari et al. | |
| 8,881,151 B2 | 11/2014 | Dawson et al. | |
| 9,756,677 B2* | 9/2017 | Backholm | H04L 69/16 |
| 9,800,511 B2* | 10/2017 | Backholm | H04L 47/323 |
| 9,820,330 B2* | 11/2017 | Nirantar | H04W 76/045 |
| 9,942,341 B2* | 4/2018 | Fleming | H04L 67/28 |
| 2007/0297609 A1* | 12/2007 | Adams | H04L 63/0853 380/270 |
| 2008/0159163 A1* | 7/2008 | Valli | H04L 43/10 370/252 |
| 2009/0003319 A1* | 1/2009 | Sood | H04L 12/66 370/352 |
| 2010/0077063 A1* | 3/2010 | Amit | H04L 12/12 709/221 |
| 2010/0174808 A1* | 7/2010 | Dabagh | G06F 1/3203 709/221 |
| 2010/0332212 A1* | 12/2010 | Finkelman | G06F 1/3203 703/23 |
| 2011/0191610 A1* | 8/2011 | Agarwal | G06F 1/3203 713/310 |
| 2011/0307887 A1* | 12/2011 | Huang | G06F 1/3228 718/1 |
| 2012/0072910 A1* | 3/2012 | Martin | G06F 9/45533 718/1 |
| 2012/0102084 A1* | 4/2012 | Hiltunen | G06F 1/32 709/201 |
| 2012/0117401 A1* | 5/2012 | Gobriel | G06F 1/3209 713/320 |
| 2012/0272235 A1* | 10/2012 | Fahrig | G06F 9/45558 718/1 |
| 2013/0007484 A1* | 1/2013 | Gobriel | G06F 1/3209 713/320 |
| 2013/0138791 A1* | 5/2013 | Thomas | H04L 67/02 709/223 |
| 2013/0227554 A1 | 8/2013 | Tsirkin et al. | |
| 2013/0311617 A1* | 11/2013 | Takahashi | H04L 43/10 709/219 |
| 2014/0101489 A1 | 4/2014 | Yang | |
| 2014/0173594 A1 | 6/2014 | Ng et al. | |
| 2014/0215082 A1* | 7/2014 | Backholm | H04L 65/4084 709/227 |
| 2014/0321448 A1* | 10/2014 | Backholm | H04W 76/045 370/338 |
| 2014/0344805 A1* | 11/2014 | Shu | G06F 9/45558 718/1 |
| 2014/0359089 A1* | 12/2014 | Davis | G06F 15/177 709/221 |
| 2014/0372788 A1 | 12/2014 | Vavrick et al. | |
| 2014/0373095 A1* | 12/2014 | Yoon | H04L 63/10 726/3 |
| 2015/0029543 A1* | 1/2015 | Morita | G06F 3/1236 358/1.15 |
| 2015/0055594 A1* | 2/2015 | Nirantar | H04W 76/045 370/329 |
| 2015/0067179 A1* | 3/2015 | Fleming | H04L 67/28 709/227 |
| 2015/0067682 A1 | 3/2015 | Calder et al. | |
| 2015/0089272 A1 | 3/2015 | Nelson et al. | |
| 2015/0382302 A1* | 12/2015 | Davis | H04W 52/0235 370/311 |
| 2016/0062780 A1* | 3/2016 | Young | G06F 9/45558 718/1 |
| 2016/0127308 A1* | 5/2016 | Yu | H04W 52/0235 709/219 |
| 2016/0134584 A1* | 5/2016 | Lang | G06F 9/45558 709/220 |
| 2017/0005873 A1* | 1/2017 | Strandzhev | G06F 9/45558 |
| 2017/0005878 A1* | 1/2017 | Strandzhev | H04L 41/20 |
| 2017/0094710 A1* | 3/2017 | Nirantar | H04W 76/045 |
| 2017/0171906 A1* | 6/2017 | Backholm | H04W 76/045 |
| 2017/0325280 A1* | 11/2017 | Backholm | H04L 69/16 |
| 2018/0042067 A1* | 2/2018 | Nirantar | H04W 52/0258 |

OTHER PUBLICATIONS

Kallitsis et al., "Presence-Aware Optimum Resource Allocation for Virtual Collaboration Web 3.0 Environments", GLOBECOM Workshops, 2009 IEEE, Nov. 30-Dec. 4, 2009, pp. 1-5.

Zou et al., "Design of Heartbeat Invalidation Detecting Mechanism in Triple Module Redundant Multi-Machine System", 2009 IEEE Circuits and Systems International Conference on Testing and Diagnosis (ICTD), Apr. 28-29, 2009, pp. 1-4.

Loveland et al., "Leveraging virtualization to optimize high-availability system configurations", IBM Systems Journal, vol. 47, No. 4, 2008, pp. 591-604.

"Takeover delay in Heartbeat HA cluster", Unix & Linux Stack Exchange, Jun. 21, 2014, p. 1.

"VM and Application Monitoring", ESXi and vCenter Server 5 Documentation, http://pubs.vmware.com/vsphere-50/index.jsp?topic=%2Fcom.vmware.vsphere.avail.doc_50%2FGUID-62B80D7A-C764-40CB-AE59-752DA6AD78E7.html, Dec. 2, 2014, pp. 1-2.

"VCenter Server Heartbeat Administrator's Guide", VMware vCenter Server Heartbeat 6.6, http://www.vmware.com/pdf/vcenter-server-heartbeat-66-administration-guide.pdf, VMware, Inc., 2013, pp. 1-102.

"Hb_takeover(1)—Linux man page", http://linux.die.net/man/1/hb_takeover, Dec. 2, 2014, p. 1.

* cited by examiner

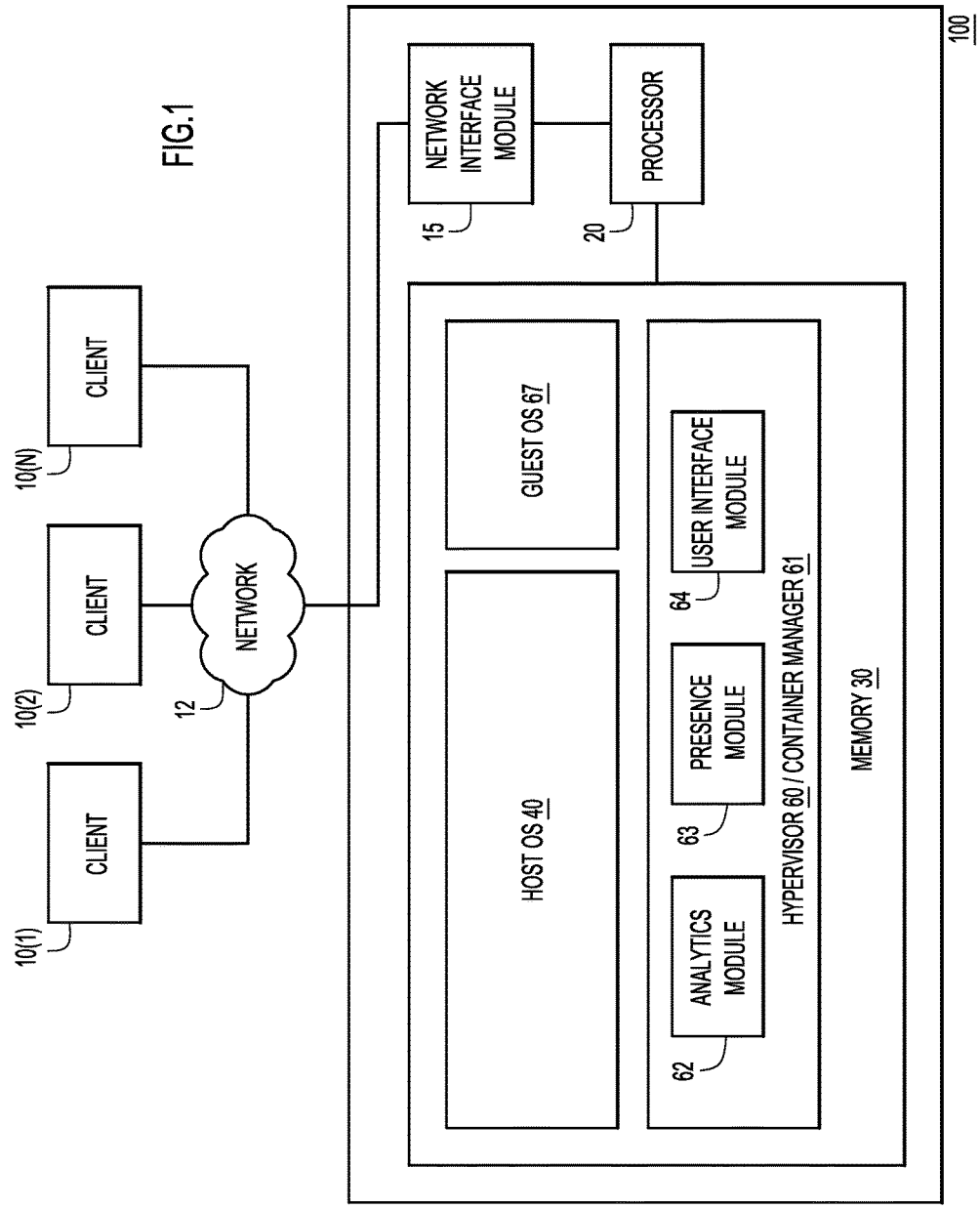

MIMICKING A PRESENCE NOTIFICATION FROM AN APPLICATION EXECUTING ON A VIRTUAL COMPONENT TO OPTIMIZE COMPUTING RESOURCE ALLOCATION/UTILIZATION

BACKGROUND

1. Technical Field

Present invention embodiments relate to optimizing resource allocation/utilization, and more specifically, to mimicking a presence notification generated by an application running on a virtual component to provide improved utilization of computing resources.

2. Discussion of the Related Art

In order to optimize utilization of computing resources on a server, maximizing the number of virtual machines (VMs) running under a hypervisor is desirable. In some instances, an application running on a VM may consume computing resources primarily to provide a presence notification to another application running on another VM or machine. Such presence notifications, also referred to as heartbeat notifications, are a type of status signal occurring at a designated interval to indicate that the application is still available. Absence of a presence notification may indicate that the VM or application has malfunctioned or crashed.

In virtualized systems, a hypervisor instantiates and manages one or more VMs. Although hypervisors have the capability to downsize resources allocated to a VM, simply downsizing resources is generally not sufficient to optimize utilization of available computing resources. For example, when a presence notification is generated and transmitted by an application running on a VM, computational activity on the VM may transiently spike. In response, the amount of computing resources provisioned for that VM may be increased in response to this transient spike, leading to an underutilization of computing resources (as the VM is primarily idle except for the generation of presence notifications). Although an administrator may set an upper limit on the amount of computing resources provisioned to a VM, this limit may still be ultimately governed by the amount of resources needed to generate and transmit presence notifications. Accordingly, generation and transmission of presence notifications (in the absence of other computational activity) may lead to consumption of computing resources that could otherwise be utilized.

SUMMARY

According to embodiments of the present invention, machines, systems, computer-implemented methods and computer program products for mimicking a presence notification for an application to optimize utilization of computing resources of a system comprising a plurality of virtual components and a virtual component manager are provided. Components may refer to any virtualized component, e.g., virtual machines, containers, etc., and a virtual component manager may refer to any manager for managing virtualized components, e.g., hypervisors, container managers, etc. Using the virtual component manager, one or more virtual components that are each performing functions limited to providing a presence notification for an application may be detected. The detected one or more virtual components may be suspended, and the presence notifications for each application (running in the environment provided by the virtual component) may be generated and transmitted by the virtual component manager. Suspending a virtual component that is solely providing a presence notification for an application frees up computational resources that may be utilized for provisioning other virtual components and enhances processing speed and efficiency.

Present invention embodiments include mimicking, by a virtual component manager, a presence notification for an application running in a virtual environment. In preferred embodiments, an indication is received from a user of the one or more virtual components that are performing functions limited to providing presence notifications. In some embodiments, the indication from the user indicates which virtual component(s) of a plurality of virtual components are providing presence notifications, allowing such components to be easily and efficiently suspended.

In preferred embodiments, the one or more virtual components that are performing functions limited to providing presence notifications for an application may be determined based on an analysis of communications of that virtual component, CPU usage by that virtual component, and/or memory utilization by that virtual component. Accordingly, present invention embodiments analyze multiple characteristics of a component (e.g., a container, a virtual machine, etc.) when determining whether that component is performing operations limited to providing presence notifications, thus, ensuring robust identification of idle components.

In other preferred embodiments, each application running on a virtual component sends a presence notification with characteristics corresponding to the application through a virtual component manager for transmission to a designated endpoint. The virtual component manager may analyze or inspect the packets comprising the received presence notification to identify characteristics to include in a mimicked presence notification. The virtual component manager may then generate presence notifications (for the application) having the corresponding characteristics, when the computing environment, e.g., virtual component, for the application has been suspended. Accordingly, mimicked presence notifications (for future presence notifications) may be generated in an automated and dynamic manner, when the corresponding virtual component has been suspended. Once generated, the mimicked presence notification is transmitted.

In other preferred embodiments, the characteristics for the presence notification(s) of one or more applications running on virtual components may be received from a user through manual input. A user may also indicate which virtual component is to be suspended. Accordingly, present invention embodiments allow for a user to fully customize a presence notification, e.g., based on a manual configuration screen.

In other preferred embodiments, the characteristics for the presence notification(s) of one or more applications running on virtual components may be determined based on an analysis of prior presence notifications from those applications running on those virtual components. Accordingly, the virtual component manager may automatically and efficiently identify presence notifications and their associated characteristics, based on stored data pertaining to previous presence notifications and/or their corresponding characteristics from applications running on virtual components. In other embodiments, stored data may be used to identify new presence notifications that are similar to previously generated presence notifications.

In still other preferred embodiments, one or more virtual components may provide encrypted communications. The one or more virtual components providing encrypted communications are determined to perform functions limited to providing a presence notification for an application(s). The presence notification may be detected based on detecting patterns in the transmission of the encrypted communications. An alert notification may be provided to a user, indicating the determined one or more virtual components (limited to sending presence notifications). An indication may be received from the user of the one or more determined virtual components to suspend the components based on the alert notification. Accordingly, present invention embodiments also provide a way to identify presence notifications in encrypted communications, resulting in not only freeing up resources allocated for the virtual components, but also, reducing computational work associated with generating and sending encrypted messages.

These and other aspects, features and advantages of the present invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

Generally, like reference numerals in the various figures are utilized to designate like components.

FIG. 1 is an example hardware environment in accordance with an embodiment of the present invention.

Features, elements, and aspects that are referenced by the same numerals in different figures represent the same, equivalent, or similar features, elements, or aspects, in accordance with one or more embodiments.

DETAILED DESCRIPTION

Figure 2A:
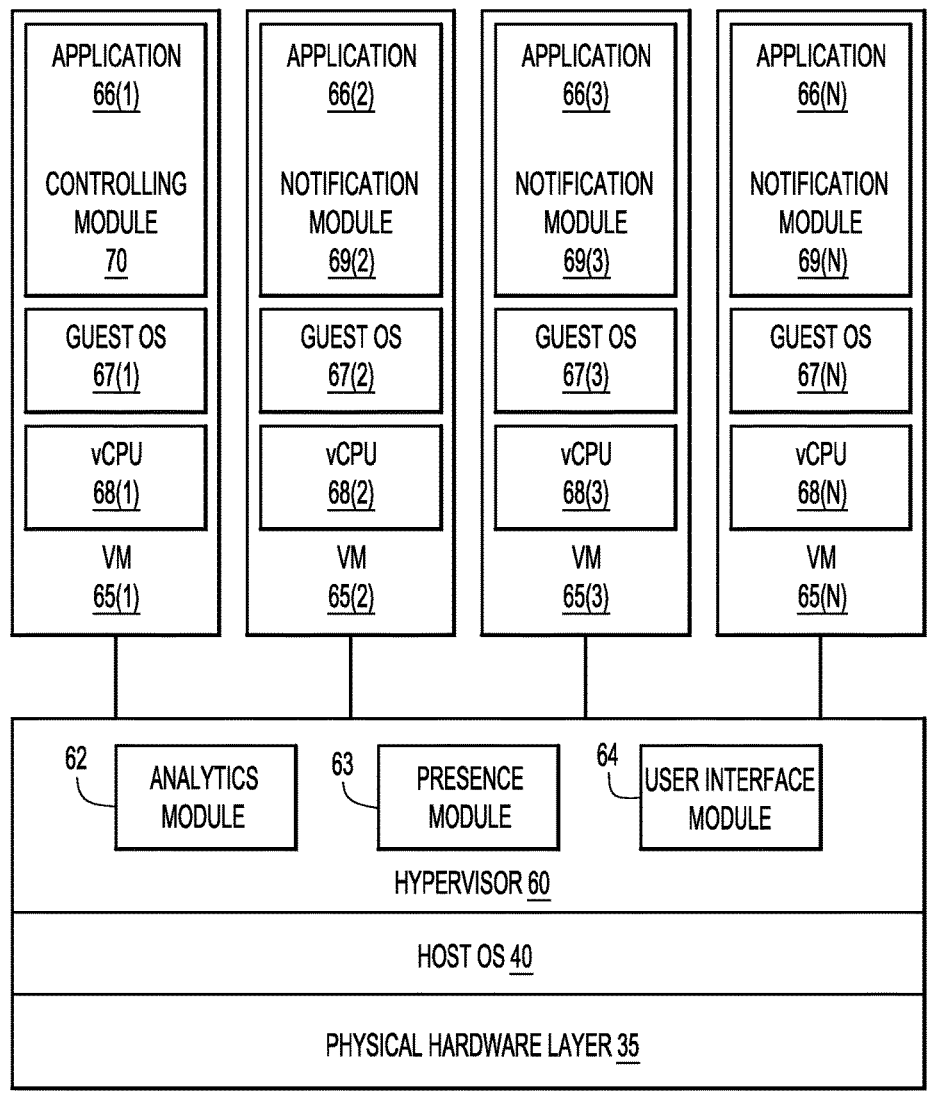
FIGS. 2A and 2B are illustrations showing examples of virtual component architectures in accordance with embodiments of the present invention.

Virtualization allows for more efficient use of computing resources in terms of processing capabilities and memory utilization. For example, having the ability to run multiple operating systems and/or multiple applications on a single physical server enables more efficient utilization of computing resources.

In some embodiments, virtualization utilizes a VM manager, also referred to as a hypervisor, to create and manage instances of VMs. A hypervisor may interact directly with a Host Operating System (OS), or with the physical hardware of the server itself, to partition available computing resources, e.g., memory, processing capabilities, etc., to ensure that each VM has sufficient allocated resources for operation. In some embodiments, each instance of a virtual machine has designated computing resources, e.g., a guest operating system, processing, and memory resources. VMs are commonly utilized for distributed computing in cloud-based environments.

In other embodiments, virtualization includes containers, which may run in any suitable environment provided by an operating system. A daemon (e.g., a container manager) may be used to provision and control one or more containers. Each container is essentially an additional process running in a suitable environment. A container may include software and corresponding dependencies needed to execute the software, e.g., source code, system tools, system libraries, etc. Containers are also commonly utilized for distributed computing in cloud-based environments. Unlike virtual machines, containers may share computing resources, e.g., an operating system, libraries, bins, etc., to maximize physical resources of a server for executing software/applications.

In some instances, applications may be distributed across multiple components, e.g., VMs, containers, etc. For example, one component may execute a controlling application, which manages applications that are distributed across other components. Accordingly, the controlling application may periodically receive communications, referred to as presence notifications or heartbeat notifications, from the distributed applications, indicating their presence to the controlling application. According to present invention embodiments, computing resources may be more efficiently allocated and utilized by suspending components that are deemed to be idle (e.g., limited to generating and sending presence notifications), to free up resources consumed by idle components.

When a component is not being utilized for purposes other than providing a presence notification for an application, the component manager may provide the presence notification instead, and free up associated resources used for the component, namely processor and memory (e.g., Random Access Memory (RAM)) resources. In some embodiments, shared resources may be preserved if other containers are still utilizing those shared resources. Accordingly, present invention embodiments allow for efficient allocation and use of computing resources by releasing computing resources that are being used primarily for providing presence notifications.

It is understood that the following description and figures may apply to any virtualized component and any virtualized component manager for applications running in a distributed computing environment.

An example hardware environment for use with present invention embodiments is illustrated in FIG. 1. Specifically, the environment includes a server system 100, and multiple client or end-user systems 10(1)-10(N). Present invention embodiments are not limited to this environment, and may include any number of server systems 100 or client systems 10(1)-10(N).

Server system 100 and client systems 10(1)-10(N) may be remote from each other and communicate over a network 12. The network may be implemented by any number of any suitable communications media (e.g., wide area network (WAN), local area network (LAN), Internet, Intranet, etc.). Alternatively, server system 100 and client systems 10 may be local to each other, and communicate via any appropriate local communication medium (e.g., local area network (LAN), hardware, wireless link, Intranet, etc.).

Server system 100 may comprise network interface module 15, processor 20, and memory 30. Network interface module 15 may be utilized for sending and receiving data, e.g., in the form of packets or any other suitable transmission format. Processor 20 may be utilized for executing instructions and software stored in memory 30. In virtualized systems, the processing capabilities of processor 20 may be partitioned and distributed across multiple instantiated VMs/containers. Memory 30 may comprise stored instructions for host Operating System (OS) 40, Guest OS 67 (as appropriate for VMs), hypervisor 60/container manager 61 and associated modules, including analytics module 62, presence module 63 and user interface module 64. Client systems 10(1)-10(N) enable users to access VMs/containers created by hypervisor 60/container manager 61 running on server 100. Hypervisor 60/container manager 61 and their corresponding modules are described in additional detail throughout the specification. It is also understood that present invention embodiments are not limited to the examples provided herein, e.g., analytics module 62, presence module 63 and user interface module 64 may reside on one or more systems accessible by hypervisor 60/container manager 61.

Server system 100 and client systems 10 may be implemented by any conventional or other computer systems preferably equipped with a display or monitor, a base (e.g., including at least one processor 20, one or more memories 30 and/or internal or external network interfaces or communications devices 15 (e.g., modem, network cards, etc.)), optional input devices (e.g., a keyboard, mouse or other input device), and any commercially available and custom software (e.g., server/communications software, analytics module 62, presence module 63, user interface module 64, browser/interface software, VM manager 60, container manager 61, etc.). The client systems may present a graphical user (e.g., GUI, etc.) or other interface (e.g., command line prompts, menu screens, etc.) through which to access the VM/container as well as applications running on the VM/container.

With reference to FIG. 2, an example VM architecture in accordance with embodiments of the present invention is shown. Server 100 comprises a physical hardware layer 35 including network interface module 15, processor 20 and memory 30. Host OS 40 may utilize the resources available as part of physical hardware layer 35 for operation. Hypervisor 60 may interface with host OS 40 to utilize available resources in physical hardware layer 35 to create, run and manage one or more VMs. It is also expressly understood that in other embodiments, hypervisor 60 may interface directly with physical hardware layer 35, as host OS 40 may not be required.

Hypervisor 60, also referred to as a VM manager, executes on server system 100 to control the physical hardware layer 35, e.g., processor 20, host memory 30 and other host resources. Hypervisor 60 may also comprise analytics module 62, presence module 63 and user interface module 64. Analytics module 62 may be utilized for analyzing a VM to determine if the VM is idle, e.g., whether a VM is forwarding an application's generated presence notifications in the absence of other substantive computational activity. Analytics module 62 may also analyze communications between VMs to generate information to be utilized as part of mimicking a presence notification from an application. Presence module 63 may be utilized for generating and transmitting presence notifications (with the information obtained from analytics module 62), which replace the presence notifications from the application (on a suspended VM). In some embodiments, analytics module 62 and/or presence module 63 may be enabled through a configuration panel of hypervisor 60. In other embodiments, analytics module 62 and/or presence module 63 may be enabled by default.

User Interface Module 64 allows a user or administrator to manually configure characteristics of a presence notification corresponding to an application on a suspended VM. In some embodiments, hypervisor 60 may provide an Application Programming Interface (API) or other interface through which the developer or administrator may set the characteristics of the presence notification.

Hypervisor 60 allocates the resources of the host server system 100 to create multiple VMs 65(1)-65(N), with each VM having a corresponding Guest Operating System (OS) 67(1)-67(N), a virtual CPU (vCPU) 68(1)-68(N), and one or more applications 66(1)-66(N) running within the environment provided by guest OS 67(1)-67(N). A Guest OS is an OS that runs in the environment provided by the VM. Each VM may execute a different Guest OS, e.g., VM 65(1) may execute a Linux-based OS, VM 65(2) may execute a Windows-based OS, and so forth. A vCPU is a physical CPU that is assigned to a VM. For example, with respect to multi-core processors, each core may be assigned to a different VM.

In distributed computing systems, an application may be distributed across multiple VMs. Accordingly, one of the VMs of the plurality of VMs running on server 100 may have a controlling module 70 for controlling the applications running on the other VMs. In such a distributed computing system, the applications running on VMs 65(2)-65(N) may provide presence notifications via notification modules 69(2)-69(N) to controlling module 70 of application 66(1) running on VM 65(1), to indicate their presence to the controlling module.

Each instance of a VM may have an associated Guest OS 67 that consumes several Gigabytes of RAM during operation as well as a vCPU 68 that consumes processing resources. In instances in which the operation of the VM is limited to forwarding ongoing presence notifications from an application, the VM is considered to be idle. In such situations, it is desirable to free up consumed memory and processing resources by the VM.

Figure 2B:
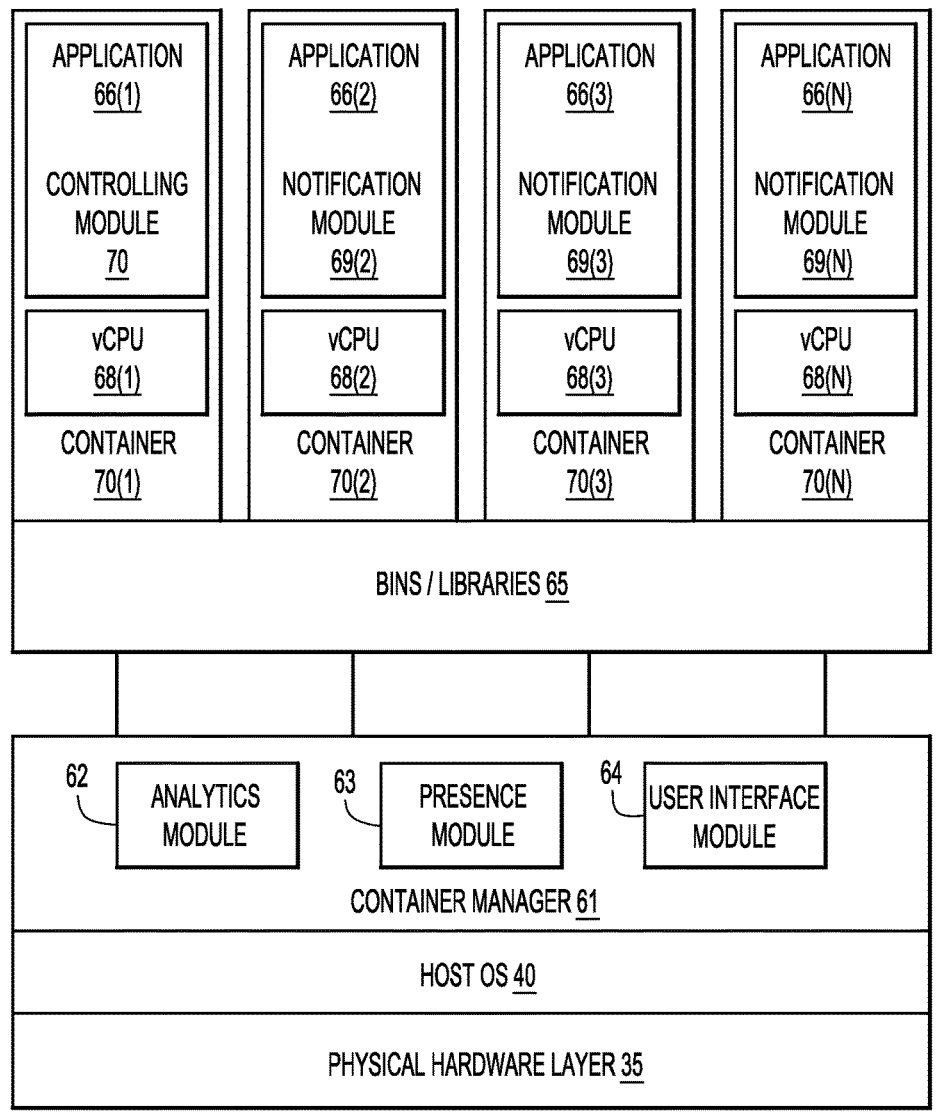

FIG. 2B shows an example architecture for containers in accordance with embodiments of the present invention. Notably, containers 70(1)-70(4) may share the same operating system, e.g., HOST OS 40, and may also share bins and libraries 65 that are common to each application 66(1)-66(N). A container manager 61 may instantiate and manage containers 70(1)-70(4), as well as provide presence notifications as described herein.

Figure 3B:
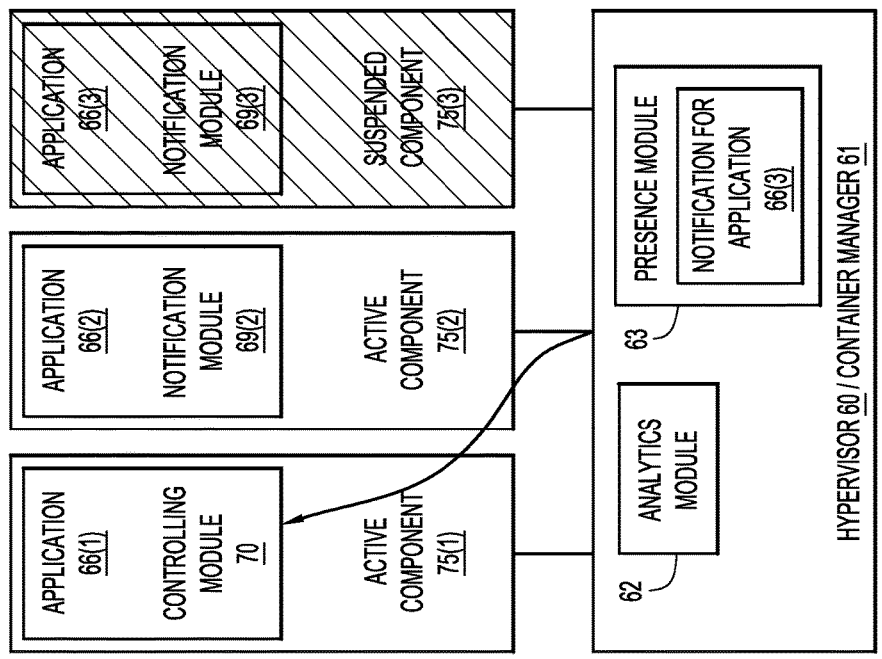
FIGS. 3A and 3B are illustrations showing examples of generation and transmission of presence notifications for active and suspended virtual components in accordance with embodiments of the present invention.
Figure 3A:
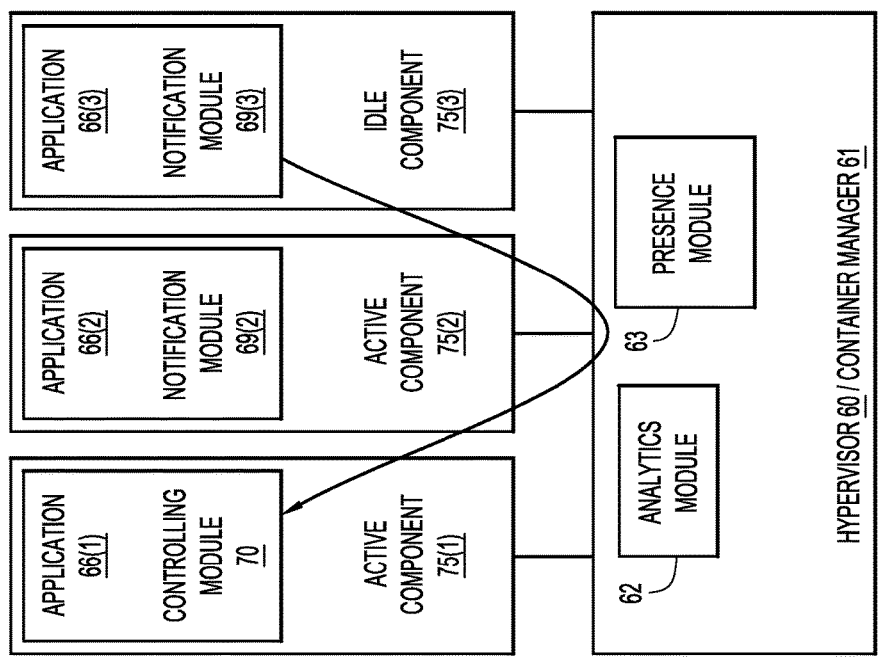

Referring to FIGS. 3A and 3B, an example is shown of presence notifications from an application being suspended at an idle component and subsequently sent from a component manager.

Referring to FIG. 3A, component 75(3) (of components 75(1)-75(3)) is determined to be in an idle state, performing computations that are limited to providing presence notifications. In this example, a component may refer to a virtual machine or a container. In some instances, an idle state may refer to providing a presence notification as well as performing other operations for maintaining a component (excluding computational work).

Notification module 69(3) may generate a presence notification to be sent to controlling module 70. The presence notification is transmitted through hypervisor 60/container manager 61, providing hypervisor 60/container manager 61 (and analytics module 62) with access to the presence notification and its associated characteristics, e.g., one or more of the identity of the source machine from which the presence notification (for the application) was generated, the identity of the destination machine to which the presence notification is being sent, the interval that the presence notification is being transmitted, the size/length of the transmitted packet(s), and the signature of the presence notification itself (e.g., a timestamp or a string characterizing the application sending the presence notification), etc. Accordingly, analytics module 62 can analyze the information within the presence notification to determine the characteristics of the presence notification, and provide the determined characteristics to presence module 63 for mimicking of the presence notification.

By receiving a presence notification from a component that includes characteristics of that component (including characteristics of the corresponding application running on the component), and transmitting the presence notification, the virtual component manager (e.g., hypervisor 60 or container manager 61) may analyze the presence notification to identify characteristics for inclusion in a mimicked presence notification. The virtual component manager may then generate a presence notification mimicking the received presence notification from the component, based on these characteristics.

Referring to FIG. 3B, an example is shown of presence notifications being sent from a virtual component manager, mimicking presence notifications that were previously sent from an application running on a component. Upon detecting that component 75(3) is in an idle state, as shown in FIG. 3A, the component is placed into a suspended state, as shown in FIG. 3B. Once component 75(3) is suspended, corresponding presence notifications for application 66(3) are generated by hypervisor 60/container manager 61, based on information provided by analytics module 62, and transmitted to controlling module 70.

When a VM is suspended, a snapshot of the current state of the VM is generated and stored in a file e.g., a .vmss file, etc., which may be loaded at a later point in time to restore the state of the suspended VM. A suspended VM is not deleted, as it can be restored based upon information within the stored file.

In instances in which a container is suspended, associated RAM resources may become available. If the application/server is stateless, stopping the container will clear the RAM used by the process. Upon a restart, the next request may be serviced. If the application/server is stateful, stopping the container may necessitate maintaining the memory in RAM, or caching the memory to the secondary memory (e.g., hard drive), thus freeing up RAM with the (cheaper cost of) secondary memory.

Memory and processing resources are freed up when the idle component is suspended, allowing another instance of a component to be instantiated and used for computational purposes. Accordingly, a significant amount of computing resources may become available through suspension of components whose most resource intensive computation is providing a presence notification from an application. Suspending a component that is solely providing a presence notification frees up computational resources that may be utilized for provisioning other components as well as enhances processing speed and efficiency.

Figure 4:
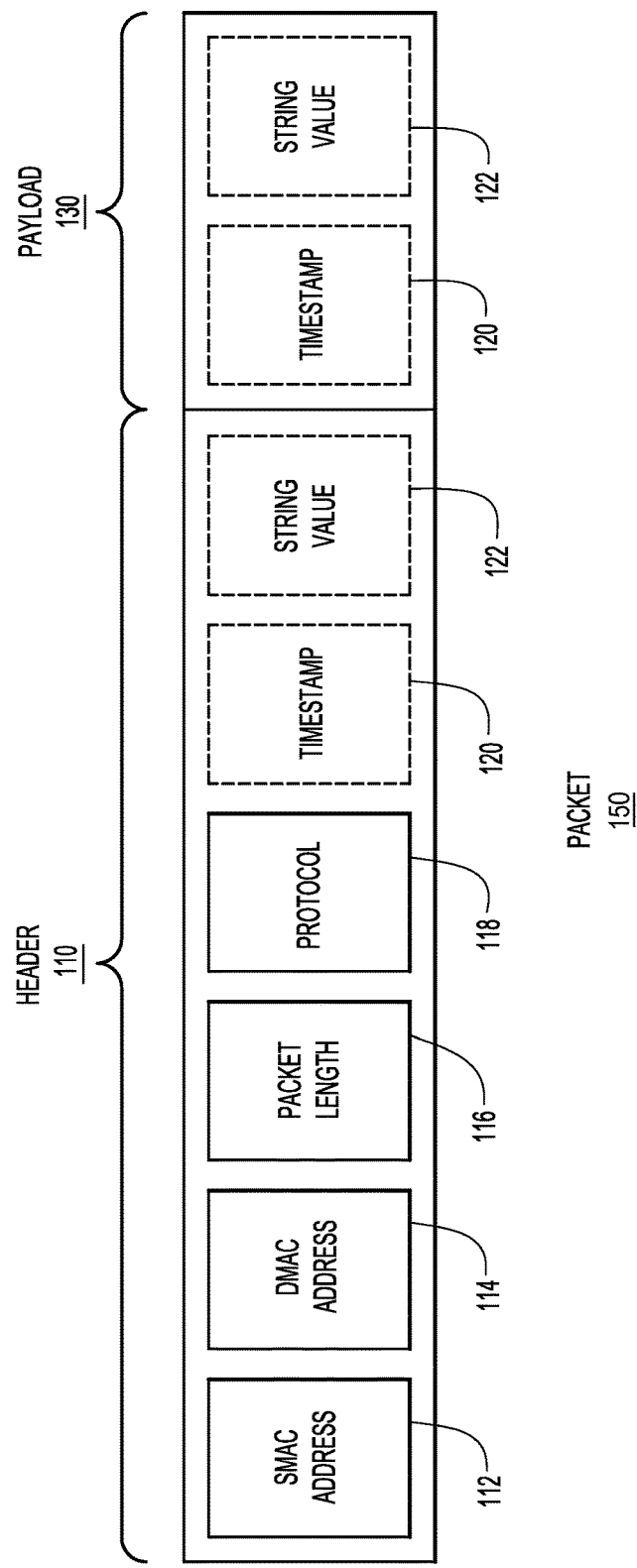
FIG. 4 is an example of a packet comprising information that may be included as part of a presence notification in accordance with embodiments of the present invention.

FIG. 4 shows an illustration of various components of a packet 150 comprising information associated with a presence notification. In some embodiments, a presence notification may be provided in the form of information embedded in a packet.

In general, a packet 150 may contain a header 110 and a payload 130. Header 110 comprises information related to routing the packet as well as characteristics of the packet itself. Payload 130 generally comprises data. It is understood that header 110 may contain additional components (not shown) utilized for control and data integrity purposes, e.g., components utilized for routing, components utilized for error checking, etc. The components shown in FIG. 4 are not intended to be limiting with regard to the types of components that may be included in a packet.

In particular, header 110 may comprise Source Media Access Control (SMAC) address 112, Destination Media Access Control (DMAC) address 114, packet length 116, and transmission protocol 118. SMAC address 112 provides the address from which the packet has been sent. DMAC address 114 includes the address to which the packet is being sent. Packet length 116 provides a total length/size of the packet. Transmission protocol 118 may indicate the protocol through which the transmission is being sent, e.g., Uniform Data Protocol (UDP), Transmission Control Protocol (TCP), etc.

In general, a variety of types of fields may be used for presence notifications, provided that the sender is able to generate and send packets comprising the information, and that the receiver is able to receive, process and understand the information in the packets. In some embodiments, the presence notification may depend on how the application was developed.

In FIG. 4, example fields are shown pertaining to information that may be associated with the signature of a presence notification. Such fields include, but are not limited to, timestamps such as timestamp 120, string values such as string value 122, etc. Fields 120 and 122 may be included either in the header 110 or as part of payload 130.

Timestamp 120 comprises the date and/or time that the packet was generated by the application providing the presence notification and may be provided in the form of a string, a date value, or any equivalent. String value 122 may comprise a string indicating information specific to the application providing the presence notification, e.g., the name of the application, location of where the application is running, etc., or any other information that may characterize the application.

Analytics module 62 may analyze packets to identify information contained within the packet, and may provide this information to presence module 63 for generating a presence notification. For example, in a preferred embodiment, analytics module 62 may identify a DMAC address (in order to determine where to send the notification), a SMAC address (in order to determine which VM/container to suspend), a timestamp (e.g., between successive presence notifications in order to determine an appropriate interval for providing a mimicked presence notification), and any other information (e.g., string value 122, port name, host name, etc.) needed for mimicking a presence notification.

Thus, analytics module 62 may automatically determine the signature of a presence notification, e.g., by inspecting packets of the presence notification to determine characteristics of communication patterns (e.g., a communication contacting the same host and/or port at a periodic interval, etc.). Once a signature has been automatically determined, the presence notification may be automatically generated by presence module 63 and sent to a desired destination. Alternatively, confirmation from an administrator may be needed before presence module 63 is permitted to generate and send mimicked presence communications.

Figure 8:
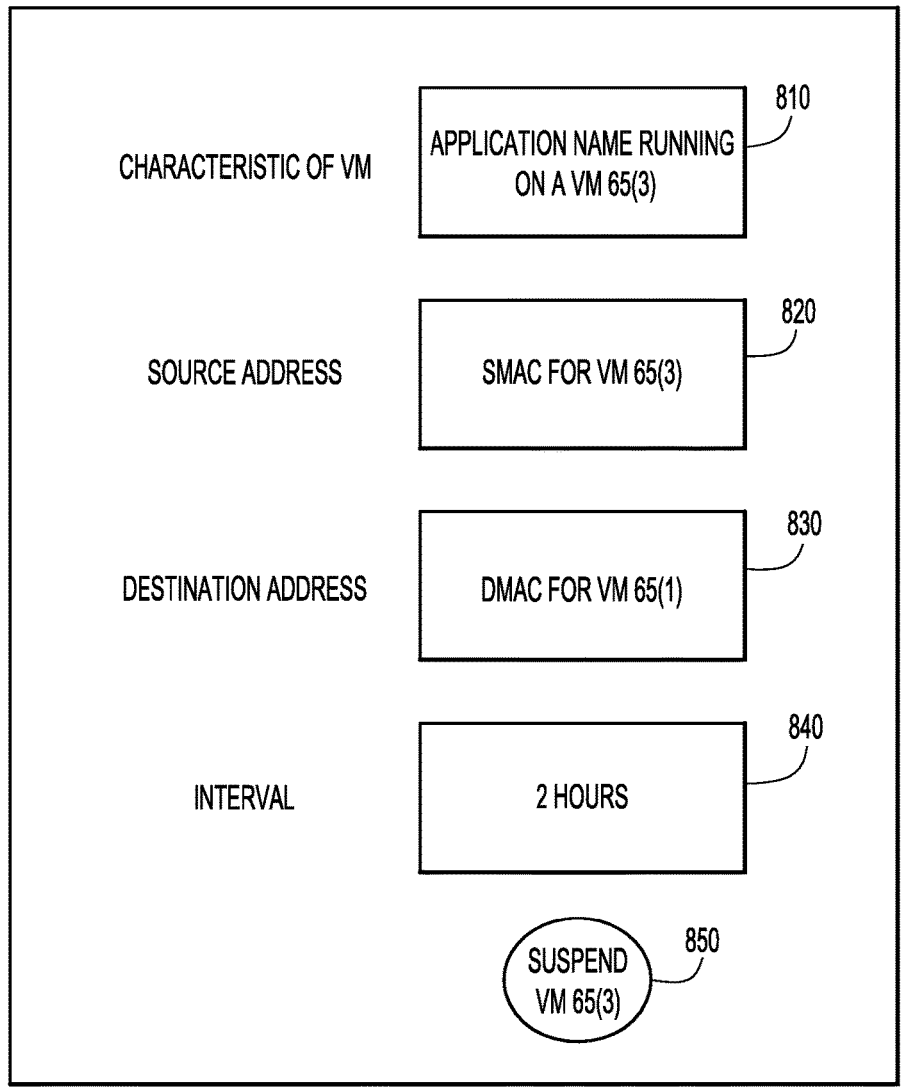
FIG. 8 is an illustration of an example user interface for receiving as input, characteristics of a presence notification, in accordance with embodiments of the present invention.

In still other embodiments, and with reference to FIG. 8, an API associated with the VM/container or with the applications running on the VM/container may be used to provide characteristics associated with presence notifications directly to the hypervisor/container manager.

Figure 5:
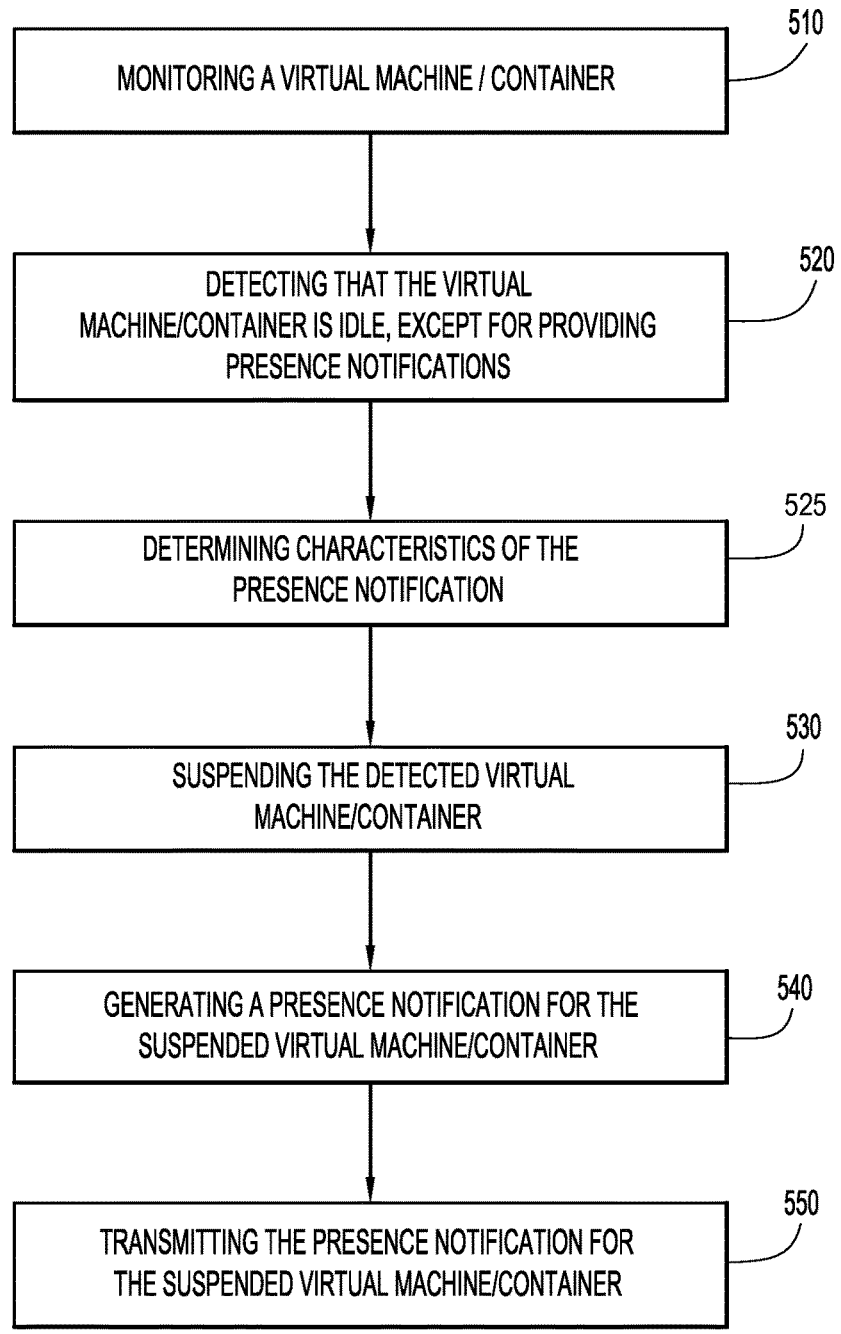
FIG. 5 is a procedural flow chart showing a method of transitioning a presence notification from an application running on a virtual component to a virtual component manager in accordance with embodiments of the present invention.

FIG. 5 shows an example flow diagram of operations performed by a component manager, e.g., hypervisor 60 or container manager 61, as shown in FIGS. 3A and 3B. For example, communications between controlling module 70 of component 75(1) and the other components 75(2)-75(3) pass through hypervisor 60/container manager 61, providing hypervisor 60/container manager 61 with access to presence notifications, and thus, information associated with the presence notifications. According to present invention embodiments, hypervisor 60/container manager 61, having access to such communications, may analyze the information contained within the packets in order to identify and manage idle components, thereby maximizing utilization of physical computing resources.

Accordingly, operations 510-550 are from the perspective of hypervisor 60/container manager 61 managing a plurality of VMs/containers. At operation 510, hypervisor 60/container manager 61 monitors a VM/container. At operation 520, the monitored VM/container is determined/detected to be idle. It is understood that idle signifies that the VM/container is not performing computational work, except for periodically generating and transmitting a presence notification indicating that the application is present.

At operation 525, characteristics of the presence notification may be determined by analytics module 62. Analytics module 62 may analyze communications between an application and its corresponding controlling module to identify communications that are presence notifications (corresponding to an idle VM/container), as well as identify information needed to generate a presence notification that mimics a presence notification provided by an application running on an idle VM/container. This analysis may be performed at any point in the flow diagram prior to the suspension of the VM/container Examples of determining that a VM/container is idle are provided throughout the specification as well as in FIG. 6.

In some embodiments, a presence notification from an application running on an idle VM/container will be analyzed to determine characteristics of the presence notification needed for mimicking the presence notification. In other embodiments, characteristics of presence notifications may be entered manually or determined based upon stored data (e.g., from prior presence notifications).

At operation 530, the detected VM/container is suspended. In general, when a VM is suspended, a snapshot of the current state of the VM is captured and stored in a file. When the VM is resumed, the snapshot may be loaded, allowing the VM to be restored to its state at the time that it was suspended. In some embodiments, a snapshot of the VM may be stored in a file, e.g., a .vmss file, etc. Containers may be suspended and resumed in a similar manner.

At operation 540, a presence notification for the suspended VM/container is generated by presence module 63. A notification may be generated prior to suspension of the VM/container or immediately after suspension of the idle VM/container. At operation 550, the presence notification for the application on the suspended VM/container is transmitted to controlling module 70.

Figure 6:
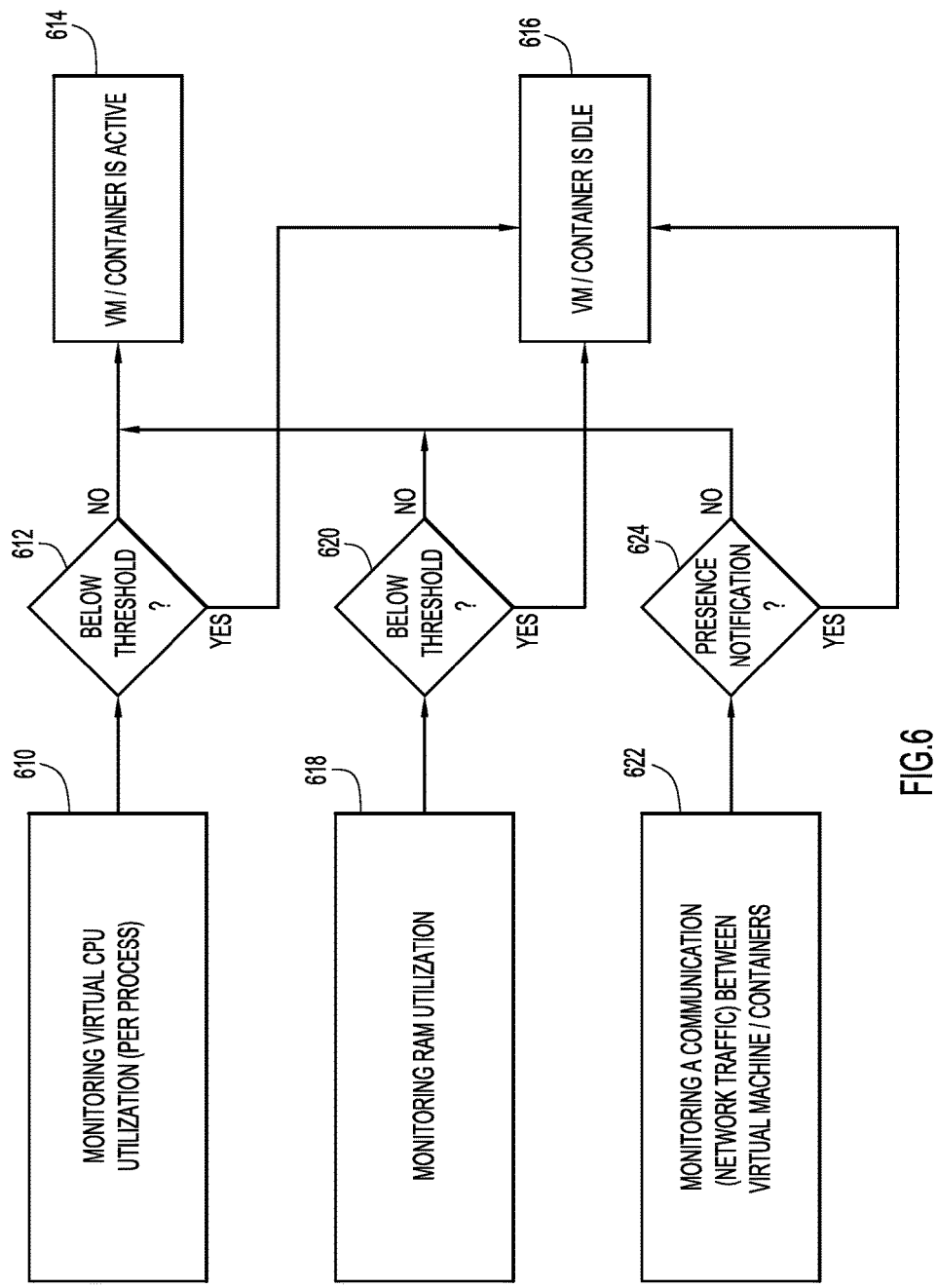
FIG. 6 is a procedural flow chart, related to FIG. 5, showing methods of determining whether a component is idle, in accordance with embodiments of the present invention.

FIG. 6 shows an example flow diagram for operations of analytics module 62, regarding determining/detecting whether a VM/container is idle. It is understood that determination of whether a component is idle is not limited to the examples provided in this figure. For example, in some embodiments, CPU utilization may be high and memory utilization may be low, but the component may not necessarily be determined to be idle. Multiple factors (and various combinations of such factors) may be considered when determining whether a machine is idle.

At operation 610, vCPU 68 utilization may be monitored. In the event that vCPU 68 utilization falls below a threshold and remains below this threshold for a specified period of time, as shown at operation 612, VM manager 60/container manager 61 may determine that the VM/container is idle at operation 616. Otherwise, the VM/container is determined to be active at operation 614.

Another example of determining when a VM/container is idle is shown at operations 618 and 620. At operation 618, RAM utilization may be monitored by VM manager 60/container manager 61. In the event that RAM utilization falls below a threshold and remains below this threshold for a specified period of time, as shown at operation 620, VM manager 60/container manager 61 may determine that the VM/container is idle at operation 616. Otherwise, the VM/container is determined to be active at operation 614.

Still another example of determining when a VM/container is idle is shown at operations 622 and 624. At operation 622, a communication is monitored between an application running on a VM/container and a controlling module for that application running on another VM/container.

At operation 624, one or more packets may be analyzed to determine whether the communication is a presence notification. In one embodiment, a communication may be determined to be a presence notification by analyzing the characteristics of the communication. As examples, information used to characterize presence notifications may include one or more of the following: (1) a communication provided at a regular interval; (2) a communication having a payload with a fixed size (e.g., containing data that is repeating); or (3) a communication sent to the same target destination (e.g., same port, same host, etc.).

In another embodiment, a presence notification may be identified by comparing the communication to information stored from a previous presence notification. For example, a presence notification from a particular VM/container may have been previously detected. Information associated with this presence notification may have been stored in memory, e.g., as part of analytics module 62 or within a separate database accessible by analytics module 62, facilitating efficient identification of future presence notifications from the same source VM/container.

In other embodiments, hypervisor 60/container manager 61 may leverage characteristics from a known presence notification originating from a VM/container to determine whether a communication from another VM/container is a presence notification. In this embodiment, the presence communications are similar, though not necessarily identical, with respect to different VMs/containers. By maintaining a database of known presence notification signatures/characteristics, and comparing a candidate communication with information from this database, a determination may be made as to whether the candidate communication is indeed a presence notification.

Accordingly, knowledge associated with discovery of a presence notification from a VM/container may be maintained. In the event that the VM/container generates and transmits presence notifications at future points in time, the presence notifications may be easily identified and the VM/container re-suspended without progressing through a computationally intensive discovery process. The virtual machine manager/container manager may automatically and efficiently identify presence notifications and their associated characteristics, based on stored data pertaining to previous presence notifications from an application running on a virtual machine or within a container.

Based on this analysis, analytics module 62 may determine/detect, at operation 616, that the VM/container is idle. Otherwise, the VM/container is determined to be active at operation 614.

Present invention embodiments include using any combination of the operations listed above, e.g., any of operations 610-612, 618-620, and 622-624, to determine whether a VM/container is idle. Accordingly, present invention embodiments analyze multiple characteristics of a VM/container when determining whether the VM/container is performing operations limited to providing presence notifications, ensuring robust identification of idle VMs/containers.

Figure 7:
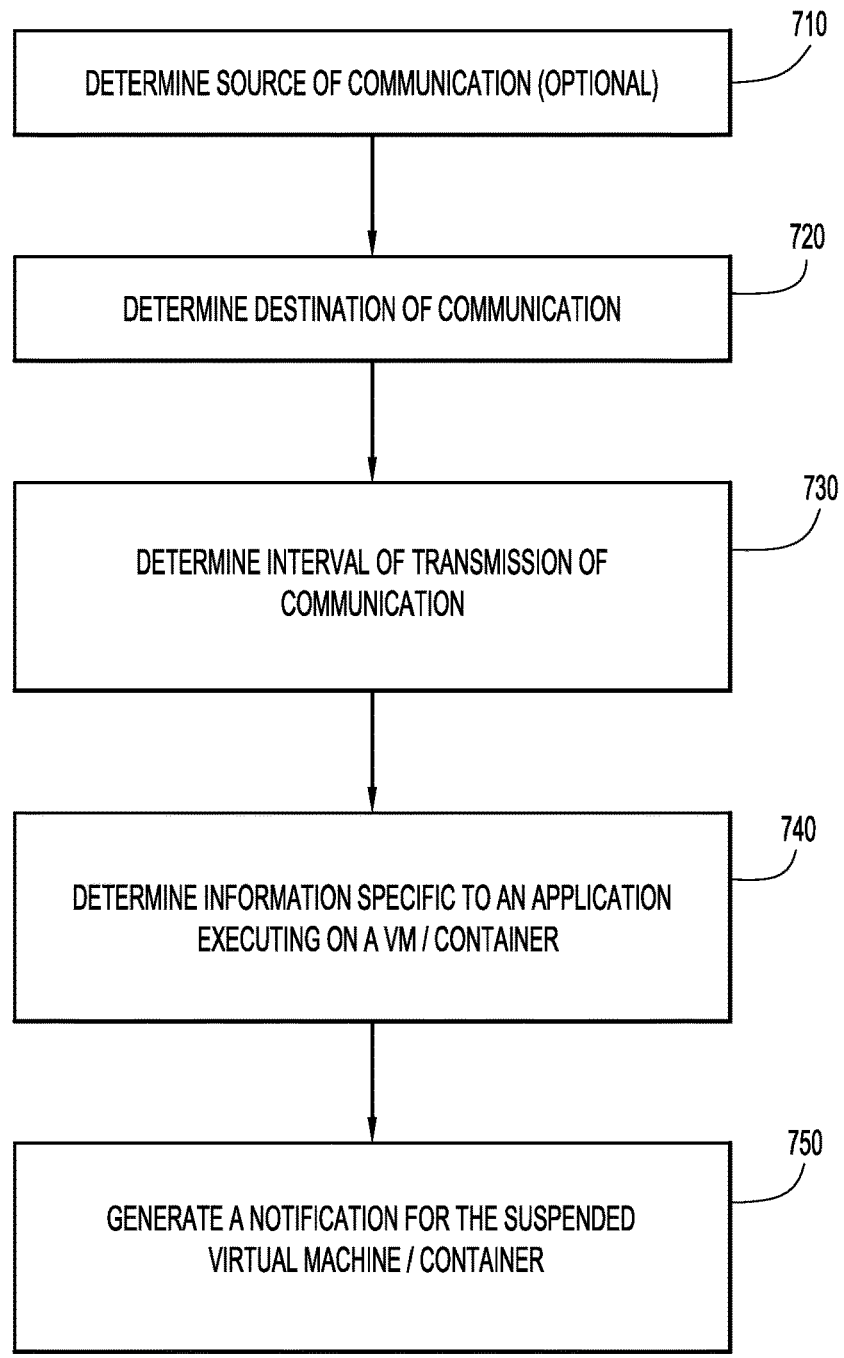
FIG. 7 is a procedural flow chart, related to FIG. 5, showing methods of automatically generating a presence notification by a virtual component manager in accordance with embodiments of the present invention.

FIG. 7 shows an example flow diagram for generating notifications, e.g., per presence module 63, automatically at hypervisor 60/container manager 61. The characteristics to generate the notification by the virtual component manager, at operation 750, may be determined from analyzing presence notifications (based on operations 710-740) from applications running in virtual components. Once the characteristics have been determined, the component may be suspended.

At operation 710, VM manager 60/container manager 61 may (optionally) inspect packets to determine the origin/source of the packet, e.g., the VM/container from which the packet was sent. In some embodiments, identification may be based upon one or more of a port or Machine Access Control (MAC) address corresponding to the source VM/container. At operation 720, the VM manager/container manager may inspect packets to determine the destination of the packet, e.g., the VM/container to which the packet is being sent. Similarly, identification may be based upon one or more of a port or Machine Access Control (MAC) address corresponding to the destination VM/container. At operation 730, an interval of transmission of the presence notification is determined, e.g., in some embodiments, the interval may be determined based upon timestamp information from two or more successive presence notifications, e.g., a time difference between successive communications or an average of multiple time differences. At operation 740, information specific to an application running on the VM/container may be determined, e.g., characteristics associated with the signature of the presence notification, including the name of the application, the location of the application, etc. At operation 750, a notification is automatically generated by the VM manager/container manager based on the characteristics from one or more of operations 710-740.

FIG. 8 shows an example illustration of a user interface for manually configuring a presence notification, e.g., at hypervisor 60. Input field 810 allows a user to input a particular characteristic of a presence notification for transmission, e.g., input of a string field such as an application name running on a VM, or any other information associated with the signature of the presence notification, e.g., information that would allow the controlling module to recognize the transmission as a presence notification. Alternatively, a list of characteristics may be provided in the form of a drop down list corresponding to previously identified or stored characteristics. Input field 820 allows entry of a SMAC address, e.g., from a drop-down menu or by manual entry, which indicates the source of the transmission. Input field 830 allows entry of a DMAC address, e.g., from a drop-down menu or by manual entry, which indicates the destination of the transmission. Although not shown, destination port information may be specified as well. Input field 840 allows a user to select a particular interval at which a presence notification will be transmitted. Selection button 850 allows a user or administrator to suspend a particular VM machine, and begin transmitting mimicked presence notifications corresponding to the suspended VM, once all desired parameters specifying the characteristics of the transmission have been entered. Present invention embodiments allow for a user to fully customize a presence notification. In addition, a user can quickly and easily select a VM to suspend, by providing an indication (e.g., a suspension command) to the hypervisor for a particular VM.

It is understood that FIG. 8 is not intended to be limiting with regard to present invention embodiments. Many other types of input fields falling within the scope of present invention embodiments may be present within such a user interface. For example, a user may directly indicate (select) which VM is to be suspended, based on any type of information that may be used to identify a particular VM from a plurality of VMs.

In addition, present invention embodiments also include a graphical user interface for manually configuring a presence notification from a container manager.

Figure 9:
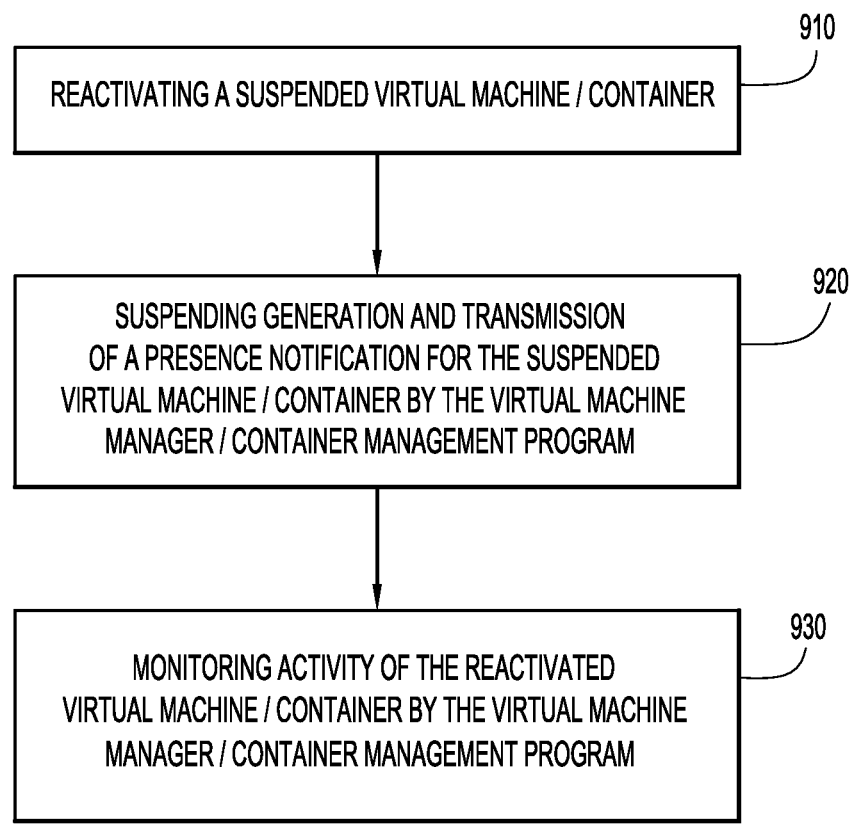
FIG. 9 is a procedural flow chart showing a method of transitioning presence notifications from a virtual component manager to an application running on a component in accordance with embodiments of the present invention.

FIG. 9 shows an example flow diagram of transferring generation and transmission of presence notifications from hypervisor 60/container management 61 back to component 75, upon the component becoming active. At operation 910, a suspended VM/container is reactivated, e.g., by loading a .vmss file or other equivalent. At operation 920, generation and transmission of a presence notification by VM manager 60/container manager 61 is suspended. The application running on the VM/container resumes generation and transmission of presence notifications upon reactivation. At operation 930, the VM manager/container manager resumes monitoring the reactivated VM/container in order to detect when the VM/container once again becomes idle.

In other preferred embodiments, a presence notification may be detected in encrypted communications. By monitoring the characteristics of a communication, e.g., an interval at which a communication is occurring, a size of the transmission, a destination, etc., a VM manager/container manager may be able to determine that the encrypted transmission is likely to be a presence notification.

In other preferred embodiments, hypervisor 60/container manager 61 may have access to the necessary certificates (or any other type of public or private keys) to decrypt the encrypted traffic. Once in decrypted form, the operations described above may be applied. In some embodiments, the certificates/keys are provided to hypervisor 60/container manager 61, e.g., by an administrator, system, server, controller, etc.).

The VM manager 60/container manager 61 may flag the transmission for review by an administrator, and the administrator may determine whether or not to suspend the VM/container. Accordingly, present invention embodiments also provide a way to identify presence notifications in encrypted communications, leading to not only freeing up resources allocated for the VM/container, but also, reducing computational work associated with generating and sending encrypted messages.

A module may include one or more modules or units to perform the various functions of present invention embodiments described below. The various modules (e.g., analytics module 62, presence module 63, user interface module 64, etc.) may be implemented by any combination of any quantity of software and/or hardware modules or units, and may reside within memory 30 of the server and/or client systems for execution by processor 20.

Present invention embodiments may be utilized to optimize resource utilization to increase processing speed and efficiency as well as minimize squandering of computing resources from allocating resources to VMs/containers that are limited to providing presence notifications.

It will be appreciated that the embodiments described above and illustrated in the drawings represent only a few of the many ways of implementing embodiments for mimicking presence notifications.

The environment of the present invention embodiments may include any number of computer or other processing systems (e.g., client or end-user systems 10, server systems 100, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, operating system software, analytics module 62, presence module 63, user interface module 64, hypervisor 60, container module 61, application software 66, etc.). These systems may include any types of monitors and input devices (e.g., keyboard, mouse, voice recognition, etc.) to enter and/or view information.

It is to be understood that the software (e.g., analytics module 62, presence module 63, user interface module 64, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., analytics module 62, presence module 63, user interface module 64, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., characteristics of presence notifications including information contained within packets such as SMAC addresses, DMAC addresses, timestamps, string values, intervals of transmission, port information, host information, application-specific information, etc.). The database system may be implemented by any number of any conventional or other databases, data stores or storage structures (e.g., files, databases, data structures, data or other repositories, etc.) to store information (e.g., characteristics of presence notifications including information contained within packets such as SMAC addresses, DMAC addresses, timestamps, string values, intervals of transmission, port information, host information, application-specific information, etc.). The database system may be included within or coupled to the server and/or client systems. The database systems and/or storage structures may be remote from or local to the computer or other processing systems, and may store any desired data (e.g., characteristics of presence notifications including information contained within packets such as SMAC address, DMAC address, timestamps, string values, intervals of transmission, port information, host information, application-specific information, etc.).

The present invention embodiments may employ any number of any type of user interface (e.g., Graphical User Interface (GUI), command-line, prompt, etc.) for obtaining or providing information (e.g., characteristics of presence notifications including information contained within packets such as SMAC addresses, DMAC addresses, timestamps, string values, intervals of transmission, port information, host information, application-specific information, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may include any manner of mimicking a notification or communication from an application running in a distributed virtualized environment, e.g., a VM, a container, from the VM or container itself, etc. when it is desirable to reallocate resources consumed by that virtualized component, e.g., for higher priority computations. For instance, when additional resources are needed, a VM/container performing lower priority computations may be suspended, and a VM manager/container manager may provide ongoing notifications during the time this VM/container is suspended. Once other higher priority computations are complete, the VM/container and/or associated applications may be reactivated and notifications originating from the application running on the VM/container or from the VM/container itself reinitiated. In other embodiments, the VM manager/container manager may continue to send presence notifications after a VM/container is re-activated, in order to conserve resources. Present invention embodiments may also generally include monitoring transmissions between VMs/containers, identifying any recurring communications, and utilizing the embodiments presented herein to mimic recurring transmissions to reduce computational workload.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of conserving resources of a computing system comprising a plurality of virtual components and a virtual component manager, the method comprising:

detecting, via the virtual component manager, one or more virtual components each performing functions limited to providing a presence notification for an application executing within that virtual component;

determining that additional resources of the computing system are needed for computations of a first priority and identifying a virtual component performing computations of a second lower priority;

suspending the detected one or more virtual components and the identified virtual component;

transmitting the presence notification for the application by the virtual component manager for the detected one or more virtual components and the identified virtual component;

activating the detected one or more virtual components from suspension in response to the detected one or more virtual components performing computations;

activating the identified virtual component from suspension in response to completion of the computations of the first priority; and continuing to transmit the presence notification for the application by the virtual component manager after activation of the suspended virtual components to conserve the resources of the computing system.

2. The method of claim 1, wherein the detecting further comprises:

receiving an indication from a user of at least one of the one or more virtual components each performing functions limited to providing the presence notification for the application.

3. The method of claim 1, wherein the detecting further comprises:

detecting the one or more virtual components each performing functions limited to providing the presence notification for the application based on an analysis of one or more from a group of: communications of that virtual component, CPU usage by that virtual component, and memory utilization by that virtual component.

4. The method of claim 1, wherein each virtual component provides the presence notification for the application, the presence notification comprising characteristics corresponding to the application executing within that virtual component, and wherein transmitting the presence notification for each suspended virtual component further comprises:

generating the presence notification for the application with the corresponding characteristics for the application.

5. The method of claim 4, wherein the generating the presence notification for the application further comprises:

receiving the characteristics for the presence notification for the application from a user.

6. The method of claim 4, wherein the generating the presence notification for the application further comprises:

determining the characteristics for the presence notification based on an analysis of a prior presence notification for that application executing on that virtual component.

7. The method of claim 1, wherein at least one of the one or more virtual components provide encrypted communications, and the detecting further comprises:

determining the at least one virtual component providing encrypted communications that each perform functions limited to providing the presence notification for the application based on detecting patterns in transmission of the encrypted communications;

sending an alert notification indicating the determined at least one virtual component to a user; and receiving an indication from the user of the determined at least one virtual component to suspend based on the alert notification.

8. The method of claim 1, wherein the suspended virtual components are virtual machines and the virtual component manager is a virtual machine manager.

9. The method of claim 1, wherein the one or more suspended virtual components are containers and the virtual component manager is a container manager.

10. A computer program product for conserving resources of a computing system including a plurality of virtual components and a virtual component manager, said computer program product comprising a computer readable storage medium having computer readable program instructions embodied therewith, the computer readable program instructions, when executed by a processor, cause the processor to:

detect, via the virtual component manager, one or more virtual components each performing functions limited to providing a presence notification for an application executing within that virtual component;

determine that additional resources of the computing system are needed for computations of a first priority and identify a virtual component performing computations of a second lower priority;

suspend the detected one or more virtual components and the identified virtual component;

transmit the presence notification for the application by the virtual component manager for the detected one or more virtual components and the identified virtual component;

activate the detected one or more virtual components from suspension in response to the detected one or more virtual components performing computations;

activate the identified virtual component from suspension in response to completion of the computations of the first priority; and continue to transmit the presence notification for the application by the virtual component manager after activation of the suspended virtual components to conserve the resources of the computing system.

11. The computer program product of claim 10, wherein the computer readable program instructions cause the processor to:

receive an indication from a user of at least one of the one or more virtual components each performing functions limited to providing the presence notification for the application.

12. The computer program product of claim 10, wherein the computer readable program instructions cause the processor to:

detect the one or more virtual components each performing functions limited to providing the presence notification for the application based on an analysis of one or more from a group of: communications of that virtual component, CPU usage by that virtual component, and memory utilization by that virtual component.

13. The computer program product of claim 10, wherein each virtual component provides the presence notification for the application, the presence notification comprising characteristics corresponding to the application executing within that virtual component, and wherein the computer readable program instructions transmitting the presence notification for each suspended virtual component comprises:

generating the presence notification for the application with the corresponding characteristics for the application.

14. The computer program product of claim 13, wherein the computer readable program instructions cause the processor to:

receive the characteristics for the presence notification for the application from a user.

15. The computer program product of claim 13, wherein the computer readable program instructions cause the processor to:

determine the characteristics for the presence notification based on an analysis of a prior presence notification for that application executing on that virtual component.

16. The computer program product of claim 10, wherein at least one of the one or more virtual components provide encrypted communications, and wherein the computer readable program instructions cause the processor to:

determine the at least one virtual component providing encrypted communications that each perform functions limited to providing the presence notification for the application based on detecting patterns in transmission of the encrypted communications;

send an alert notification indicating the determined at least one virtual component to a user; and receive an indication from the user of the determined at least one virtual component to suspend based on the alert notification.

17. The computer program product of claim 10, wherein the suspended virtual components are virtual machines and the virtual component manager is a virtual machine manager.

18. The computer program product of claim 10, wherein the suspended virtual components are containers and the virtual component manager is a container manager.

19. A system for conserving resources of a computing system including a plurality of virtual components and a virtual component manager comprising:

one or more memories; and at least one processor coupled to the one or more memories and configured to:

detect, via the virtual component manager, one or more virtual components each performing functions limited to providing a presence notification for an application executing on those virtual components;

determine that additional resources of the computing system are needed for computations of a first priority and identify a virtual component performing computations of a second lower priority;

suspend the detected one or more virtual components and the identified virtual component;

transmit the presence notification for the application by the virtual component manager for the detected one or more virtual components and the identified virtual component;

activate the detected one or more virtual components from suspension in response to the detected one or more virtual components performing computations;

activate the identified virtual component from suspension in response to completion of the computations of the first priority; and continue to transmit the presence notification for the application by the virtual component manager after activation of the suspended virtual components to conserve the resources of the computing system.

20. The system of claim 19, wherein the at least one processor is configured to:

receive an indication from a user of at least one of the one or more virtual components each performing functions limited to providing the presence notification for the application.

21. The system of claim 19, wherein the at least one processor is configured to:
    detect the one or more virtual components each performing functions limited to providing the presence notification for the application based on an analysis of one or more from a group of: communications of that virtual component, CPU usage by that virtual component, and memory utilization by that virtual component.

22. The system of claim 19, wherein each virtual component provides the presence notification for the application, the presence notification comprising characteristics corresponding to the application executing within that virtual component, and wherein the at least one processor for transmitting the presence notification for each suspended virtual component is configured to:
    generate the presence notification for the application with the corresponding characteristics for the application.

23. The system of claim 22, wherein the at least one processor is configured to:
    receive the characteristics for the presence notification for the application from a user.

24. The system of claim 22, wherein the at least one processor is configured to:
    determine the characteristics for the presence notification for the application based on an analysis of a prior presence notification from that application executing on that virtual component.

25. The system of claim 19, wherein at least one of the one or more virtual components provide encrypted communications, and wherein the at least one processor is configured to:
    determine the at least one virtual component providing encrypted communications that each perform functions limited to providing the presence notification for the application based on detecting patterns in transmission of the encrypted communications;
    send an alert notification indicating the determined at least one virtual component to a user; and
    receive an indication from the user of the determined at least one virtual component to suspend based on the alert notification.

26. The system of claim 19, wherein the suspended virtual components are virtual machines and the virtual component manager is a virtual machine manager.

27. The system of claim 19, wherein the suspended virtual components are containers and the virtual component manager is a container manager.

* * * * *